United States Patent [19]

Bewersdorf et al.

[11] Patent Number: 5,714,201
[45] Date of Patent: Feb. 3, 1998

[54] PROCESS FOR REDUCING DISSOLUTION TIME IN THE PRODUCTION AND/OR COATING OF SODIUM PERCARBONATE

[75] Inventors: Martin Bewersdorf, Gelnhausen; Birgit Bertsch-Frank, Rheinfelden; Wolfgang Lortz, Waechtersbach, all of Germany

[73] Assignee: Degussa Aktiengesellschaft, Frankfurt am Main, Germany

[21] Appl. No.: 713,649

[22] Filed: Sep. 13, 1996

[30] Foreign Application Priority Data

Sep. 15, 1995 [DE] Germany ............... 195 34 274.7

[51] Int. Cl.$^6$ .................. B05D 1/24; B05D 1/02; C01B 15/10
[52] U.S. Cl. .................. 427/213; 427/215; 427/421; 427/426; 423/265; 423/415
[58] Field of Search .................. 427/426, 212, 427/213, 215, 421; 423/265, 415

[56] References Cited

U.S. PATENT DOCUMENTS 4,428,914   1/1984   Brichard et al. .

FOREIGN PATENT DOCUMENTS

| 96503 | 3/1973 | Denmark . |
|---|---|---|
| 0202519 | 11/1986 | European Pat. Off. . |
| 0623553 | 11/1994 | European Pat. Off. . |
| 0669282A1 | 8/1995 | European Pat. Off. . |
| 2419252 | 10/1979 | France . |
| 2060971 | 7/1971 | Germany . |
| 2250342 | 5/1973 | Germany . |
| 2622458 | 12/1977 | Germany . |
| 2712138 | 9/1978 | Germany . |
| 2810379 | 9/1979 | Germany . |
| 4324104 | 1/1995 | Germany . |
| 4329205 | 3/1995 | Germany . |
| 19514187 | 5/1996 | Germany . |
| 1300855 | 12/1972 | United Kingdom . |
| 94/14701 | 7/1994 | WIPO . |

Primary Examiner—Shrive Beck
Assistant Examiner—Bret Chen
Attorney, Agent, or Firm—Beveridge, DeGrandi, Weilacher & Young, L.L.P.

[57] ABSTRACT

A process for reducing dissolution time in the production of sodium percarbonate particles containing an alkali metal silicate as stabilizer by fluidized bed spray granulation and/or by coating sodium percarbonate particles with a coating containing an alkali metal silicate, wherein a solution containing alkali metal silicate is sprayed during production and/or coating which contains alkali metal silicate having a modulus in the range from less than 3 to greater than 1. Sodium percarbonate produced by fluidized bed spray granulation is distinguished by elevated Oa stability and short dissolution times and may thus readily be used in detergents and cleaning products containing silicate builders.

12 Claims, No Drawings

PROCESS FOR REDUCING DISSOLUTION TIME IN THE PRODUCTION AND/OR COATING OF SODIUM PERCARBONATE

INTRODUCTION AND BACKGROUND

The present invention relates to a process for reducing dissolution time in the production of sodium percarbonate particles containing alkali metal silicate as stabilizer by fluidized bed spray granulation and/or in the coating of sodium percarbonate particles with a coating containing alkali metal silicate.

Sodium percarbonate is conventionally produced from hydrogen peroxide and sodium carbonate, wherein the reaction proceeds in the aqueous phase with subsequent crystallization by bringing solid soda into contact with aqueous sodium hydroxide solution or by fluidized bed spray granulation, wherein in general an aqueous soda solution and an aqueous hydrogen peroxide solution are sprayed onto nuclei in a fluidized bed. In order to avoid active oxygen (Oa) losses during production and to increase the stability of the active oxygen, it is known to use an alkali metal silicate in a quantity of up to approximately 5 wt. %, calculated as $SiO_2$. In order further to increase the Oa stability of the sodium percarbonate, which is necessary for the use thereof in detergents, in particular in detergents containing zeolites, sodium percarbonate is coated with a stabilizing coating. One of the coating components frequently used is an alkali metal silicate.

According to DE-PS 26 22 458, sodium silicate having a modulus ($SiO_2$ to $Na_2O$) of 3.5 is incorporated into the outer layer of the particle during the crystallization process in order to achieve sufficient Oa stability. Although the dissolution time of the sodium percarbonate particles is increased by the polymeric silica, this dissolution time is still generally sufficiently short for use in detergents.

It is also possible to produce sodium percarbonate in the presence of known stabilizers, in particular water glass, using known fluidized bed spraying processes, for example those according to DE-PS 20 60 971 and DE-OS 43 29 205. It has been established that while fluidized bed sodium percarbonate granulates produced using a sodium silicate having a modulus in the range from 3.2 to 3.8 do indeed exhibit satisfactory Oa stability, they have an undesirably long dissolution time.

In order further to increase Oa stability, sodium percarbonate particles are coated with single or multiple layers, wherein the coating contains one or more stabilizing substances. Typical of such stabilizers are alkali metal and alkaline earth metal salts, in particular sulphates and chlorides of sodium and magnesium, sodium carbonate and sodium bicarbonate, sodium borates and sodium perborates, sodium silicates. Further examples of such coating components are boric acids as well as alkali metal and alkaline earth metal salts of organic carboxylic acids and hydroxycarboxylic acids. Coatings containing alkali metal silicates exhibit excellent stability in this respect, c.f. for example DE-C 28 10 379, DE-A 27 12 138, DE-A 43 24 104. The rate of dissolution of the sodium percarbonate particles may sometimes be reduced considerably by such a coating containing alkali metal silicate.

According to DE-C 28 10 379, a coating of sodium perborate and sodium silicate is applied onto sodium percarbonate particles, wherein water glass having an $SiO_2$/$Na_2O$ weight ratio of 3.2 to 3.8 is preferably used. It has been established that, while dissolution time does indeed increase as the quantity of water glass of the stated modulus rises, this time was still sufficiently short in sodium percarbonate produced by crystallization, such that no problems arose with regard to excessively long dissolution time in such cases. However, if the process of DE-C 28 10 379 is applied to sodium percarbonate particles produced using a fluidized bed spraying process, dissolution time is greatly increased and this entails a problem in practical usage. DE-A 27 12 138 (coating with sodium percarbonate and a sodium silicate) also mentions sodium metasilicate and sodium disilicate, in addition to the preferably used water glass. Since a sodium percarbonate produced by crystallization is being coated in this document, no problems arose with regard to the dissolution time of the coated sodium percarbonate and there was thus no incentive to achieve shorter dissolution times by selecting a very specific sodium silicate.

In the process according to DE-A 43 24 104 (coating with magnesium sulphate, soda and sodium silicate), sodium silicate is, for example, used in the form of a water glass solution having a modulus of 3.5. While sodium silicates having a molar ratio of $SiO_2$ to $Na_2O$ of 4:1 to 1:1 may indeed be used according to this document, molar ratios of 3.5 to 2.5 are preferred.

This document also does not address the problem of excessively long dissolution time, so that no solution is disclosed in this respect.

A similar process to those stated above is known from EP-A 0 623 553: with substantially identical coating components, the sequence is preferably reversed. Before coating, the dissolution time for the sodium percarbonate is short. The sodium silicate used is water glass no. 1 or no. 3 or sodium metasilicate; the modulus to be assigned to water glass no. 1 or no. 3 was not, however, disclosed. The dissolution times of all sodium percarbonate particles coated using the process of EP-A 0 623 553 lie within a narrow range and it is not possible to discern any clear difference between the sodium silicates used.

While the above-stated document does indeed disclose storage-stable, coated percarbonate particles having a short dissolution time, it does not teach a method of purposefully adjusting dissolution time, in particular of reducing it, during production, in particular during fluidized bed spray granulation and/or during coating of sodium percarbonate. This, however, is an object of the present invention.

SUMMARY OF THE INVENTION

It is an object of the invention to reduce the dissolution time in the production of sodium percarbonate particles containing an alkali metal silicate as stabilizer and/or for coating sodium percarbonate particles with a coating containing alkali metal silicate.

In achieving the above and other objects, one feature of the invention is a process involving using fluidized bed spray granulation using an aqueous solution containing sodium percarbonate or an aqueous sodium carbonate solution and an aqueous hydrogen peroxide solution, wherein the sodium percarbonate or the sodium carbonate solution and/or the hydrogen peroxide solution or an additional solution to be sprayed contain an alkali metal silicate. The aqueous solution is sprayed into a fluidized bed containing nuclei, the dimensions of which are smaller than those of the particles to be produced. Simultaneously, water is vaporized at a fluidized bed temperature in the range from 40° to 95° C. The sodium percarbonate particles are coated by simultaneous or successive spraying of one or more solutions containing at least one coating component, wherein at least one of the solutions contains an alkali metal silicate, onto sodium percarbonate particles with simultaneous vaporization of water, which process is characterized in that the solution to be sprayed containing alkali metal silicate has a modulus (molar ratio of $SiO_2$ to alkali metal oxide) in the range from less than 3 to greater than 1.

Methods for determining storage stability and dissolution time may be found in the examples.

DETAILED EMBODIMENTS OF THE INVENTION

The process according to the invention, namely the use of an alkali metal silicate solution having a modulus in the range from less than 3 to greater than 1, preferably a water glass solution having a modulus in the range from 1.5 to 2.3, may be integrated into conventional processes for the production of sodium percarbonate in a fluidized bed. In known fluidized bed processes (explicit reference is made to the processes of DE-C 20 60 971, DE-A 43 29 205 and U.S. Pat. No. 4,428,914), either an aqueous solution containing sodium percarbonate or both an aqueous hydrogen peroxide solution and an aqueous sodium carbonate solution are sprayed into a fluidized bed dryer containing sodium percarbonate nuclei with simultaneous vaporization of water. The alkali metal silicate solution is added to the $H_2O_2$ or $Na_2CO_3$ solution, preferably to the latter; the introduced quantity of alkali metal silicate is in the range between 0.1 and 5 wt. %, preferably from 0.25 to 2.5 wt. %, in each case calculated as $SiO_2$ and relative to sodium percarbonate. The sodium silicate solution preferably used has a modulus in the range from less than 2 and greater than 1.5, such as a conventional commercial solution having a modulus of 1.8. Alternatively, a solution having the stated modulus may also be produced from a water glass solution having a modulus higher than the desired modulus and alkali metal hydroxide solution.

The sodium carbonate solution and $H_2O_2$ solution are mixed immediately before spraying in a molar ratio of substantially 2 to 3, a deficit or excess of up to 20% of one reactant is, however, possible, and the mixture is sprayed or both solutions are sprayed separately onto the nuclei using two nozzles or a three-fluid nozzle. Three-fluid nozzles with external mixing of the solution are preferred, as are used in the process of the same generic type according to DE-A 43 29 205.

The temperature in the fluidized bed will conventionally be within the range between 40° and 95° C. Sodium percarbonate particles which are larger than the nuclei are discharged from the fluidized bed apparatus with or without air classification. The process is particularly conveniently performed in fluidized bed spray granulation apparatus with integral air classification and flow channels with one or more spray zones. A flow channel particularly preferred for the production of sodium percarbonate having three-fluid nozzles at least partially directed towards each other is described in DE patent application 195 14 187.3.

As may be seen from the Examples herein below, it is surprisingly possible to considerably reduce the dissolution time of sodium percarbonate produced in the fluidized bed with the same quantity of alkali metal silicate if a water glass having a modulus of 1.8 is used instead of a water glass having a modulus of 3.2. While Oa stability may indeed be reduced by the reduction in modulus according to the invention, this reduction in Oa stability is more than offset by the coating, which is now a general requirement.

The principle according to the invention may also be integrated into a process for coating sodium percarbonate. It is possible here to use sodium percarbonate produced using any desired production process. Coating again proceeds under conditions in which sodium percarbonate particles in a fluidized state (fluidized bed) are sprayed with solutions containing one or more coating components and introduced water is simultaneously and/or subsequently vaporized. One of the solutions again contains an alkali metal silicate having a modulus according to the invention. The introduced quantity of alkali metal silicate is generally between 0.1 and 2.5 wt. %, preferably between 0.5 and 1 wt. %, in each case calculated as $SiO_2$ and relative to sodium percarbonate. Dissolution time is shortened by the reduction in modulus. Surprisingly, with the same introduced quantity of alkali metal silicate (sum of $SiO_2$ and alkali metal oxide) but a reduced modulus, there is no reduction in Oa stability. The principle according to the invention may be applied to coatings as are known from the above-stated documents. Particularly preferred embodiments contain a magnesium salt and sodium carbonate or sodium sulphate and sodium carbonate as coating components in addition to alkali metal silicate. The alkali metal silicate is conveniently not used as a constituent of a solution containing a magnesium salt, but instead as an individual solution or mixed with a solution containing $Na_2SO_4$ and/or $Na_2CO_3$. The conditions during coating and apparatus for performing coating are the same as those known to the person skilled in the art from the cited documents and also previously described in the production of the sodium percarbonate core. The entire coating generally amounts to 1 to 25 wt. %, preferably 2 to 10 wt. %, relative to the sodium percarbonate.

According to a particularly preferred embodiment of the invention, sodium percarbonate is produced by fluidized bed spray granulation and coated in the fluidized bed, wherein an alkali metal silicate solution having a modulus according to the invention is used both during production and coating. In this manner, sodium percarbonate is produced which has a sufficiently short dissolution time and good long term stability.

Uncoated and coated sodium percarbonate particles produced according to the invention may be used in detergents and bleaches, in particular detergents and bleaches containing silicate builders.

The following examples are illustrative of the invention.

EXAMPLES a) Determination of Dissolution Time 2 g of uncoated or coated sodium percarbonate are stirred in 1 l of water at approximately 15° C. The dissolution time is defined as the time at which 95% has dissolved; determination is performed conductometrically. When comparing the dissolution times of two differently produced/coated products, these products must have a comparable particle size; where necessary narrow screening fractions are compared with each other.

b) Determination of Storage Stability in Detergent Formulations

A detergent powder which is phosphate-free but contains zeolite, activator TAED and a coated or uncoated sodium percarbonate (NaPc) are mixed together in a quantity such that the mixture contains 5% TAED and the Oa content is approximately 2.35 wt. %. Constituents of the detergent powder in wt. %:

| | |
|---|---|
| anionic surfactants | 12 |
| nonionic surfactants | 8 |
| zeolite A | 36 |
| soda | 10 |
| Na silicates | 3 |
| remainder, incl. moisture | 31. |

800 g portions of the mixtures are stored at 30° C. and 80% relative humidity in a conditioning cabinet in a conventional commercial, water repellent and adhesively bonded E1 detergent packet. One packet is stored for each testing period (2, 4 and 8 weeks). The Oa content is determined by the conventional permanganate method; the Oa retention value in % is determined from the initial Oa content and the Oa content after 2, 4 and 8 weeks.

Example 1 and Comparative Example 1

Reduction in Dissolution Time During Production

Sodium percarbonate was produced in a fluidized bed spray granulation apparatus under conditions as stated in Example 2 of DE-A 43 29 205. In Example 1, sodium silicate having a modulus of 1.8 is added to the soda solution, while a sodium silicate having a modulus of 3.2 is added in Comparative Example 1; the introduced quantity of sodium silicate was 2.6 wt. % in both cases, calculated as the sum of $SiO_2$ and $Na_2O$ and relative to sodium percarbonate. The water glass solution having a modulus of 1.8 was produced from a water glass solution having a modulus of 3.2 and sodium hydroxide solution.

At a substantially identical particle size distribution, the dissolution time of the product from Example 1 was 2.3 minutes, while that of Comparative Example 1 was 4.8 minutes.

Example 2 and Comparative Example 2

Coating of a fluidized bed sprayed granulate with 2.5 wt. % of magnesium sulphate, 2.5 wt. % of soda and 1 wt. % of sodium silicate. An aqueous $MgSO_4$ solution was initially applied and then a solution containing $Na_2CO_3$ and sodium silicate in a fluidized bed spray granulation apparatus. The individual tests differed only in the modulus of the water glass used. The results may be found in Table 1.

TABLE 1

| | Comparative Example 2 | Example 2 | | |
|---|---|---|---|---|
| | | 2.1 | 2.2 | 2.3 |
| Modulus | 3.2 | 2.2 | 1.7 | 1.3 |
| Dissolution time (min) | 5.7 | 5.3 | 5.1 | 4.8 |
| Oa retention: initial value | 100 | 100 | 100 | 100 |
| after 2 weeks | 98 | 97 | 98 | 100 |
| after 4 weeks | 94 | 92 | 94 | 95 |
| after 8 weeks | 84 | 84 | 85 | 82 |

Example 3 and Comparative Example 3

Sodium percarbonate was produced in a fluidized bed spray granulation apparatus (in a similar manner to DE-A 43 29 205), wherein water glass of the stated modulus had previously been added to the soda solution to be sprayed, the introduced quantity in each case being 2.6 wt. % of sodium silicate (sum of quantities of $SiO_2$ and $Na_2O$), relative to sodium percarbonate. The resultant products were then, as in Example 2, provided with a two-layered coating of 1.6 wt. % of $MgSO_4$ and 1.6 wt. % of $Na_2CO_3$ and 0.8 wt. % of alkali metal silicate, relative to the introduced sodium percarbonate. The results may be found in Table 2.

TABLE 2

| | Comparative Example 3 | | Example 3 | |
|---|---|---|---|---|
| | uncoated | coated | uncoated | coated |
| Modulus | 3.1 | 3.1 | 1.8 | 1.8 |
| Dissolution time | 2.2 | 3.1 | 2.2 | 2.4 |
| Oa retention: initial value | 100 | 100 | 100 | 100 |
| after 2 weeks | 67 | 94 | 60 | 100 |
| after 4 weeks | 49 | 86 | 36 | 95 |

By reducing the modulus of the water glass used during production and coating, products are obtained which are more rapidly soluble and have a long, sometimes even longer storage stability than when a water glass of a higher modulus is used.

Further variations and modifications will be apparent to those skilled in the art from the foregoing and are intended to be encompassed by the claims appended hereto.

German priority application 195 34 274.7 is relied on and incorporated herein by reference.

We claim:
1. A process for reducing dissolution time in the production of sodium percarbonate particles containing an alkali metal silicate as a stabilizer comprising:
   spraying into a fluidized bed an aqueous solution containing
   (a) sodium percarbonate or
   (b) an aqueous sodium carbonate solution and an aqueous hydrogen peroxide solution,
   wherein the sodium percarbonate solution or the sodium carbonate solution and/or the hydrogen peroxide solution further contains as the stabilizer a material consisting essentially of an alkali metal silicate or an additional solution is used for said spraying which contains as the stabilizer a material consisting essentially of an alkali metal silicate,
   said fluidized bed containing nuclei, the dimensions of which are smaller than those of the said particles to be produced,
   simultaneously vaporizing water at a fluidized bed temperature in the range from 40° to 95° C.,
   said solution to be sprayed containing said alkali metal silicate as the stabilizer having a molar ratio of $SiO_2$ to alkali metal oxide in the range from 1.5 to 2.3.

2. The process according to claim 1 further comprising sodium percarbonate particles are produced by fluidized bed spray granulation and then coated, wherein a solution containing alkali metal silicate is sprayed both during production and during coating.

3. The process according to claim 2, wherein a sodium silicate solution or a mixture of a sodium silicate solution and sodium hydroxide solution are added.

4. The process according to claim 1 further comprising in order to produce the solution to be sprayed containing alkali metal silicate, a water glass solution or a mixture of a higher modulus water glass solution and alkali metal hydroxide solution in a molar ratio corresponding to the desired modulus is added to another aqueous solution optionally containing other components to be sprayed.

5. The process according to claim 1 wherein alkali metal silicate is used during production of the sodium percarbonate particles by fluidized bed spray granulation in a quantity of 0.1 to 5 wt. %, of $SiO_2$ relative to sodium percarbonate.

6. The process according to claim 5 wherein said quantity is 0.25 to 2.5 wt. %, of $SiO_2$.

7. The process according to claim 1 wherein alkali metal silicate is used during coating of the sodium percarbonate particles in a quantity of 0.1 to 2.5 wt. %, of $SiO_2$, relative to sodium percarbonate.

8. The process according to claim 7 wherein said quantity is 0.5 to 1 wt % of $SiO_2$.

9. Sodium percarbonate particles produced by the process according to claim 1.

10. A detergent composition containing the sodium precarbonate particle according to claim 9.

11. A process for reducing dissolution time in the production of sodium percarbonate particles containing an alkali metal silicate as a stabilizer and for coating sodium percarbonate particles with a coating containing alkali metal silicate as the stabilizer, comprising:

spraying into a fluidized bed an aqueous solution containing
   (a) sodium percarbonate or
   (b) an aqueous sodium carbonate solution and an aqueous hydrogen peroxide solution, wherein the sodium percarbonate solution or the sodium carbonate solution and/or the hydrogen peroxide solution further contain as the stabilizer a material consisting essentially of an alkali metal silicate or an additional solution is used for spraying containing as the stabilizer a material consisting essentially of an alkali metal silicate, said fluidized bed containing nuclei, the dimensions of which are smaller than those of the sodium percarbonate particles to be produced, simultaneously vaporizing water at a fluidized bed temperature in the range from 40° to 95° C., to thereby form sodium percarbonate particles and wherein said sodium percarbonate particles are then coated by simultaneous or successive spraying of one or more solutions containing at least one coating component and an alkali metal silicate, onto said sodium percarbonate particles with simultaneous vaporization of water, said solution to be sprayed containing alkali metal silicate as the stabilizer having a molar ratio of $SiO_2$ to alkali metal oxide in the range 1.5 to 2.3.

12. A process for reducing dissolution time in the production of coated sodium percarbonate particles containing an alkali metal silicate as a stabilizer and/or for coating sodium percarbonate particles with a coating containing alkali metal silicate, comprising:

spraying sodium percarbonate particles in a fluidized bed with an aqueous solution containing
   (a) sodium percarbonate or
   (b) an aqueous sodium carbonate solution and an aqueous hydrogen peroxide solution, wherein the sodium percarbonate solution or the sodium carbonate solution and/or the hydrogen peroxide solution further contains as the stabilizer a material consisting of an alkali metal silicate or an additional solution is used for spraying which further contains as the stabilizer a material consisting of an alkali metal silicate, said solution having a molar ratio of $SiO_2$ to alkali metal oxides in the range of 1.5 to 2.3 and further spraying said sodium percarbonate particles with a solution containing a member selected from the group consisting of sodium carbonate, sodium sulfate, magnesium salts, sodium perborates, sodium perborates and mixtures thereof.

* * * * *